July 8, 1941.  O. H. DICKE  2,248,165
SUSTAINED POWER ELECTRIC CLOCK
Filed June 5, 1934
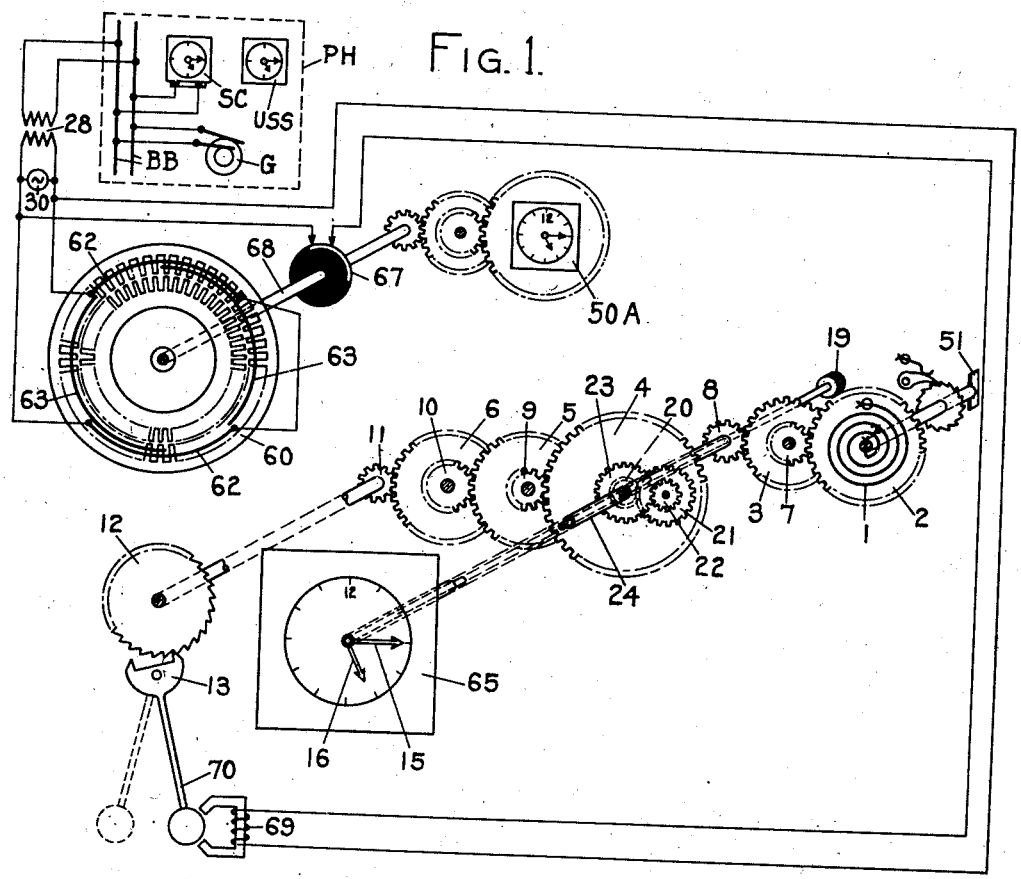
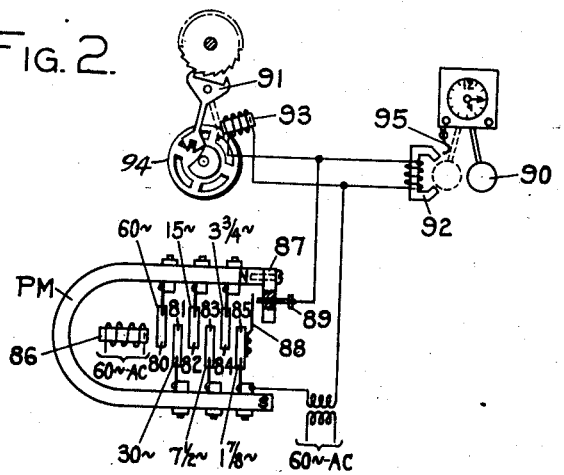
INVENTOR
O. H. Dicke Patented July 8, 1941

2,248,165

UNITED STATES PATENT OFFICE 2,248,165

SUSTAINED POWER ELECTRIC CLOCK

Oscar H. Dicke, Rochester, N. Y.

Application June 5, 1934, Serial No. 729,079

49 Claims. (Cl. 58—24)

This application is a continuation in part, in that, as to Fig. 1 it is a division of my co-pending application Ser. No. 365,584 filed May 23, 1929, which is a continuation as to Fig. 1 of my prior application Ser. No. 158,370 filed December 31, 1926, and as to Fig. 2 is a division of my prior application Ser. No. 441,109 filed April 2, 1930.

This invention relates to time indicating systems, and more particularly to systems where time indicating devices are regulated over the usual light and power distributing net-work.

It has been experienced that it is entirely practical to govern the generating units of an alternating current distributing system so that synchronous motor driven clock hands keep correct time. It has on the other hand also been experienced that it is quite common for one power distributing circuit to be cut-out for a minute or two due to the automatic opening of a circuit breaker in response to a lightning disturbance or the like, so that the synchronous motor clocks on that particular circuit will be slow or behind to that extent.

Some of the objects of the present invention reside in the provision of means whereby the number of cycles per hour of power current generated may be kept constant and by the provision of synchronous motor clock means for indicating time at the power consumer, and the provision of electrically operated governing means for controlling the escapement mechanism of a mechanical clock, and the provision of automatic power operated winding means for the mechanical escapement clocks.

Another purpose of the present invention, as exemplified in a modified form of the invention, is to actuate the escapement pallet or the pendulum of a clock by means controlled synchronously by the alternating current.

Other objects, purposes and characteristics of the present invention will in part be obvious from the accompanying drawing and in part appear from the following detailed description.

In describing the invention in detail reference will be made to the accompanying drawing in which:

Fig. 1 shows a power house equipped with a time transmitting mechanism embodying the present invention showing only one of a large number of power feeders having time indicating and regulating mechanism operated therefrom; and Fig. 2 shows a modified form of the invention.

Referring particularly to Fig. 1 the dotted rectangle P. H. represents a power house having one or more direct or alternating current generators of which the generator G, assumed to be a sixty cycle alternating current generator, only has been shown. This generator is connected to the power house bus bars BB through suitable switch means (not shown). In accordance with one form of the present invention it is proposed to indicate the time of day, at the various consumer residences, offices or factories, by driving clock hands by a synchronous motor of the usual or special construction, these clock hands only indicating the proper time if the power house equipment generates the requisite number of cycles per hour, and for this reason the power house is furnished with a synchronous motor driven clock SC and a standard clock USS indicating United States observatory time, and the power house attendant is required to keep his frequency such that the synchronous clock SC indicates the same time as the standard clock.

To one of the lighting feeders, namely feeder 28, is connected a lighting transformer which reduces the voltage from the distribution potential, of say 2200 volts, to a voltage suitable for consumers use, say 110 volts. To illustrate a lighting load for which this distributing net work is primarily used the lamp 30 has been shown. The distribution load may include some motor load which has for convenience not been shown. The clock 65 conventionally represents a clock of the mechanical escapement pendulum type, and preferably is one that is designed to beat half seconds, that is, swing to the right once per second.

Referring to Fig. 1 of the drawing the main spring 1, wound by a winder 51, the gears, 2, 3, 4, 5 and 6, diving pinions 7, 8, 9, 10 and 11, respectively, the escapement wheel 12, the escapement pawl 13, and the clock hands 15 and 16, adapted to be set by knob 19 through the medium of the usual frictional connection, constitute the usual elements of an escapement clock. These parts cooperate in the usual way, to cause the hands 15 and 16 to indicate substantially correct time.

It is well understood by those skilled in the art of chronometric instruments, that a clock of the mechanical escapement type whether of the balance wheel or pendulum type, can not possibly keep perfect time, and in accordance with the invention illustrated in connection with the clock 65 of Fig. 1, it is proposed to electromagnetically synchronize the movement of the pendulum of the clock 65 with the commercial power frequency. In the event of power failure for a short time the clock 65 will operate without the superimposed synchronous control and will therefore have the unpreventable error of this pendulum clock injected only during the time of electric power failure. If the mechanical clock, which is to have synchronized control superimposed thereon, is a balance wheel clock, the electro-magnetic action will act on the escapement in a similar way.

The usual frictional connection between the hour shaft and the clock hand driving mechanism is preferably provided. The clock hands of the clock 50A are driven by a synchronous motor of any suitable construction but is preferably driven by a novel synchronous motor 60 having an extremely low synchronous speed. The operation of this novel motor is based on the principle that if the number of teeth of the rotor is different than the number of teeth in the stator only certain of these teeth can be in alignment, and that a rotating magnetic field will cause the alignment of the teeth to rotate with the magnetic field. A vernier motor of this construction has been claimed in my Patent No. 2,066,965, granted January 5, 1937. In the particular arrangement shown, there are 48 teeth on the stator and 50 on the rotor so that the rotor will rotate through an angle of 2 teeth for each cycle. If we now assume a two-pole distributed coil type stator winding 62, and if a sixty cycle power current is used the motor will have a synchronous speed of 144 revolutions per minute. Any desired synchronous speed can of course be obtained by selecting the number of rotor and stator teeth per magnetic pole and the number of magnetic poles. The stator winding is preferably a distributed winding and may be two phase, of which one phase is connected directly to the line and the other phase derives its current from a phase shifter such as shown in the Lucas patent, hereinafter referred to, or the winding may be connected split phase, or it may be a single phase winding 62 having short circuited shading rings or coils 63 associated therewith, so as to obtain a two-pole rotating magnetic field. In any event, the preferred type of motor has a large number of teeth per pole and has a difference of one between the rotor and stator teeth per hole, and is constructed to operate on single phase current. The minute shaft (rotating one revolution per hour) and in turn the hour hand (rotating one revolution in twelve hours) of the clock 50A is driven by the motor 60 through any suitable type of gear train, such as shown, assuming of course that the proper gear ratio is selected. The small or hour hand 16 (rotating one revolution in twelve hours) of the clock 65 is driven by the minute shaft (rotating one revolution per hour) by suitable gears 20, 21, 22 and 23 through the medium of sleeve 24. Also, if desired the main spring 1 may be rewound by the motor 60 through a suitable slip clutch, as shown in my application (case B) filed on even date herewith, now Patent No. 2,185,334, granted January 2, 1940.

The mechanical escapement pendulum clock 65 may be synchronized as, for instance, by electric impulses the time spacing of which is determined by contacts operated by the synchronous motor 60. In the particular arrangement shown the synchronous motor 60 has the number of teeth per pole of the rotor and stator so chosen that the rotor through the medium of one or more contacts 67 mounted on but insulated from the motor shaft 68 closes the circuit for the magnet 69 once for each oscillation of the pendulum 70 of the clock 65, whereby this clock is caused to keep correct time. The attraction of this pendulum, which preferably includes some iron, by the electro-magnet 69 will cause the clock 65 to indicate correct time so long as there is no power failure. During the time of power failure only, the motor 60 being self starting, the clock 65 will keep correct time within such small margin that it cannot be detected for power failures of the ordinary kind. Also, if desired, the clock 65 may be set hourly by mechanism such as shown in the parent application. Also clock 65 may control repeater clocks.

The phase shifter above mentioned comprises a static transformer of peculiar construction and is fully described in the patent to Lucas No. 1,566,333 dated December 22, 1925; and consists of a core of laminated transformer iron, preferably of the general shape shown in said patent, which contains a primary winding, a secondary winding and two bucking or shading coils. This phase shifter is so constructed that the voltage induced in secondary winding is displaced substantially 90 electrical degrees with respect to the voltage impressed upon the primary winding.

Let us now refer to Fig. 2 which shows a different form of synchronizer for keeping a clock in synchronism with the alternating current of a properly regulated power system. In this modified system, the escapement of a clock is externally controlled in accordance with the lapse of alternating current cycles, that is, is synchronized with the alternating current. This may be done by acting directly on the pallet if a balance wheel clock is used, or by acting directly on the pendulum of a pendulum clock, as shown. Clocks and watches have cycles from about an eighth of a second to about two seconds, and in accordance with the invention shown in Fig. 2, the clock to be synchronized should have a beat cycle of $\frac{1}{15}$, $\frac{2}{15}$, $\frac{10}{15}$, $\frac{3}{15}$, $\frac{2}{5}$, $\frac{4}{5}$, $\frac{8}{5}$ or $1\frac{2}{5}$ seconds, this by reason of the fact that the novel reed synchronizer lends itself admirably to close a contact at these rates when operated on a sixty cycle alternating current circuit. For frequencies other than sixty cycle other beat cycles are used.

In accordance with the particular form of the invention shown in Fig. 2, a permanent magnet PM, although an electromagnet energized by either direct or alternating current may be used, has a plurality of tuned reeds (six in the form shown) secured between the legs of the magnet, so that magnetism traverses these reeds and in so doing divides and passes to the two adjacent reeds. With respect to the sixty cycle reed 80, and the one and seven-eights cycle reed 85, the magnetism divides and passes in part to the electro-magnet 86 and the fixed pole piece 87.

If a permanent magnet is used for the magnet PM, the electro-magnet 86 will during one wave attract the reed 80 and during the next wave repel the reed 80, so as to cause the reed 80 to vibrate. With the reed 80 vibrating at sixty cycles per second and since the reed 81 is tuned to vibrate thirty cycles per second, the reed 81 when once started will be closer to the reed 80 during every other vibration of the reed 80, so that during every second cycle of vibration of the reed 80 the reed 81 will be impulsed. From this it readily appears that the reed 81 will soon vibrate at a high ampltitude, and at thirty cycles per second. In the same way as just explained, the reed 82 is caused to vibrate at a high amplitude at fifteen cycles per second, the reed 83 has a natural period of vibration of seven and one half cycles per second and is vibrated once for every eighth cycle of the current, the reed 84 is caused to vibrate three and three fourths cycles per second or once for every sixteen cycles of the alternating current, and the reed 85 is caused to vibrate one and seven eighths cycle per second or one cycle in eight fifteenths seconds, or once for every thirty two cycles of the alternating current.

These reeds may be either permanent magnet steel and magnetized to aid the flow of magnetic flux or may be made of soft iron, and preferably comprise slotted pieces having flat leaf springs fastened in their slots, which leaf springs are in turn adjustably fastened, as by screws, to iron blocks, which are bolted to the permanent magnet. If soft iron reeds are used they may be surrounded by copper sleeves to stabilize the flux passing therethrough, it is believed that this would aid action that one reed will have upon its adjacent reed of the next lower order to keep it vibrating.

It is of course understood that these reeds are not so sharply tuned as to get out of step with the alternating current so long as this alternating current varies within the usual limits of a few percent.

It is thus seen that the specific arrangement shown in Fig. 2 causes the contacts 88—89 to close once for every thirty two cycles of alternating current, and that it may be used to electro-magnetically actuate a pendulum 90 as by an electro-magnet 92 or actuate an escapement pallet 91, which cooperates with a balance wheel 94 in the usual way, as by an electro-magnet 93, of a clock which beats at the rate of one cycle for every eight fifteenth seconds.

When the reed type frequency divider shown in Fig. 2 is used to control the pendulum of a clock, it is desirable to employ a spring bumper such as shown at 95 to enable the electro-magnet to increase the frequency of operation of the pendulum. In this connection it should be remembered that an increase in the amplitude of vibration of a pendulum does not necessarily increase its frequency of oscillation of such pendulum. The spring bumper 95 is ordinarily not struck by the pendulum 90 but if the pendulum is slow as compared with the intermittent excitation of the electro-magnet 92 its amplitude, or rather the arc of its swing, will be increased, so that it will strike the spring bumper, and when this occurs the force of the spring bumper aids gravity in increasing the rate of oscillation of said pendulum. When the pendulum is too fast, on the other hand, the magnetic field emitted by the electromagnet is only present when the pendulum is swinging away from the electromagnet 92, from which it is readily apparent that the electromagnet will slow down the pendulum.

The frequency divider shown in Fig. 2 is an ideal device for the purpose intended, in that it is practically frictionless, has no rubbing parts requiring lubrication or experiencing any wear, is practically noiseless and is self starting.

Having thus shown and described several embodiments of my invention, and having shown them rather specifically although certain elements thereof have been illustrated conventionally, it is desired to be understood that this has been done to exemplify the invention in a convenient manner; and it is desired to be understood that the invention is not limited to the particular arrangement shown either specifically or conventionally, and that various changes and modifications may be made to adapt the invention to any particular light and power distributing or similar system and any particular type of clock without departing from the scope of the invention or the idea of means underlying the same.

What I desire to secure by Letters Patent is:

1. In combination, an energy storing means, timing means including an oscillatory escapement driven by said energy storing means, and alternating current operated means for causing periodic flux fields proportionate to the number of cycles of alternating current applied thereto to act upon said oscillatory escapement to either aid or retard said escapement to cause said oscillatory escapement to operate in synchronism with such flux fields.

2. In combination, an alternating current source regulated to produce an average definite number of cycles per hour, frequency dividing means including apparatus for causing a single impulse of current to flow for each predetermined number of cycles of alternating current from said source, time manifesting means operated to manifest the lapse of time and operated from a separate source of energy, and means coordinating said frequency dividing means with said time manifesting means to cause said time manifesting means to operate in synchronism with current impulses supplied by said frequency dividing means during times when alternating current power is available and for allowing said time manifesting means to manifest the lapse of time as accurately as it inherently can during alternating current power failure.

3. In combination, time manifesting means including a source of stored energy and an escapement operated substantially in accordance with the lapse of time to dissipate such energy, a frequency dividing means including apparatus for causing a single impulse of current to flow for each predetermined number of cycles of alternating current applied thereto, and means coordinating said frequency dividing means with said time manifesting means to cause said time manifesting means to operate in synchronism with current impulses supplied by said frequency dividing means during times when alternating current power is available and for allowing said time manifesting means to manifest the lapse of time as accurately as it inherently can during alternating current power failure.

4. In a maintained-power synchronous electric timing-device, the combination with a time-train having an escapement-mechanism including an oscillatory-member and inherently capable of operating as an accurate timepiece when free of extraneous forces; of energy-storing driving-means for driving the said time-train; and electro-magnetic governing-means acting upon said oscillatory-member of said escapement-mechanism to at times exert an accelerating force on said member in one direction and to at other times exert an accelerating force in the opposite direction on said member for synchronously interlocking the same with the frequency of a sinuous current for movement at a rate substantially corresponding to its rate of movement when free of said governing-means.

5. In combination, an energy storing means, timing means including an oscillatory escapement driven by said energy storing means to inherently keep substantially correct time, and sinuous alternating current responsive means magnetically acting upon said escapement to either aid or retard said escapement to cause said escapement to operate at a rate proportionate to the frequency of said alternating current.

6. In a maintained-power synchronous electric timing device, the combination with a time train having an escapement mechanism including an oscillatory member and inherently capable of operating as an accurate time piece when free of extraneous forces; of stored-energy driving-means for driving the said time train; and electro-magnetic governing means acting magnetically upon said oscillatory member of said escapement mechanism for synchronously interlocking the same with the frequency of a sinuous current for movement at a rate dependent on the frequency of said sinuous current and to allow said escapement mechanism to operate freely upon failure of said sinuous current.

7. In a maintained-power synchronous electric timing device, the combination with a time train having an escapement mechanism including an oscillatory member and inherently capable of operating as an accurate time piece when free of extraneous forces; of stored-energy driving-means for driving the said time train; and electro-magnetic governing means acting upon said oscillatory member of said escapement mechanism for synchronously interlocking the same with the frequency of a sinuous current, said governing means being capable of exerting a force on said oscillatory member in either of two opposite directions to cause movement of said oscillatory member at a rate dependent on the frequency of said sinuous current and to allow said escapement mechanism to operate freely upon failure of said sinuous current.

8. In an electric clock the combination of a source of commercial alternating current of regulated frequency, a circuit closing device moving in step with said current, a clock movement, a vibrating device approximately in step with said circuit closing device regulating the motion of said movement, and means controlled by said circuit closing device to bring said vibrating device into step with said current.

9. In an electric clock the combination of a source of commercial alternating current of regulated frequency, a synchronous motor, a contact making device periodically actuated by said motor, a pendulum, means to drive said pendulum and electromagnetic means controlled by said contact making device and acting on said pendulum to keep it in step with said current.

10. In an electric clock the combination of a source of commercial alternating current of regulated frequency, a synchronous motor moving in step therewith, a contact device periodically operated by said motor, a pendulum and means controlled by said contact device acting on said pendulum to keep said pendulum in step with said current.

11. In an electric clock the combination of a source of commercial alternating current of regulated frequency, a circuit closing device moving in step with said current, a clock movement, a vibrating device moving approximately in step with said current to regulate the motion of said clock movement and electromagnetic means controlled by said circuit closing device to keep said vibrating device in step with said current.

12. In combination, a source of commercial alternating current of regulated frequency, a contact device operated in step therewith, a pendulum having approximately the same frequency as said contact device, means to drive said pendulum and an electromagnet operated by said contact device and operative on said pendulum to keep said pendulum in step with said current.

13. In combination, a source of commercial alternating current of regulated frequency, an oscillatory contact device, means controlled by said current for operating said contact device in consonance therewith, an oscillatory escapement having a natural frequency in consonance with the frequency of said contact device, means to drive said escapement, and an electro-magnet controlled by said contact device and operative on said escapement to keep escapement in consonance with said current.

14. In a clock system, a power driven clock train having a time measuring unit which is kept in operation by said train and which in turn controls the rate of operation of said train, a source of periodic current of regulated periodicity, and means governed by said current for exerting magnetic forces directly on said unit to control its rate of operation and keep it operating at a rate which bears a sub-multiple relation to the periodicity of said current.

15. In a clock system, a power driven clock train having a time measuring unit which is kept in operation by said train and which in turn controls the rate of operation of said train, a source of periodic current of regulated periodicity, means governed by said current for producing periodic magnetic fields which bear a sub-multiple relation to said periodic current, and means governed by said periodic magnetic fields to control said unit to control its rate of operation so as to bear a sub-multiple relation to the periodicity of said current.

16. In a clock system, a power driven clock train having a time measuring unit which is kept in operation by said train and which in turn controls the rate of operation of said train, a source of periodic current of regulated periodicity, means governed by said current for producing periodic magnetic fields which bear a sub-multiple relation to said periodic current, and means governed by said periodic-magnetic fields to control said unit to control its rate of operation so as to bear a sub-multiple relation to the periodicity of said periodic magnetic fields.

17. A maintained power synchronous electric device including an alternating current synchronous electric motor having an oscillating magnetic-member, an energy-storing driving motor operable independent of the application of power to said synchronous electric motor, including speed control means, and means for driving the oscillating magnetic-member of the said synchronous electric motor from said energy-storing driving motor at substantially synchronous speed during cessation of power.

18. In a clock system, a gear train, a main spring for driving said train, an escapement comprising an oscillatory system including an oscillatory inertia member and driven by said train and main spring and which in turn at times controls the rate of operation of said train, an alternating current power distribution system having its frequency regulated so as to deliver a predetermined number of cycles per unit of time, and means governed by said alternating current for exerting magnetic forces directly on said inertia member to control its rate of operation and keep it operating to correctly manifest time as determined by the frequency of said alternating current and at a rate which bears a sub-multiple relation to the frequency of said alternating current, the said oscillatory system being constructed to have a natural period of oscillation so that said gear train will substantially correctly manifest time during cessation of alternating current.

19. In combination, an energy storing means; timing means comprising an oscillatory system including an oscillatory inertia member and driven by said energy storing means; a power distribution system delivering current of regulated frequency; and alternating current operated means deriving current from said distribution system for producing periodic flux fields proportionate to the number of cycles of alternating current applied thereto to act upon said oscillatory inertia member to either aid or retard said escapement to cause said oscillatory escapement to operate at a rate so that its time period is exactly a multiple, greater than one, of the time period of said alternating current; said oscillatory system being constructed to have a natural period of oscillation when not acted upon by said alternating current which is substantially the same as it is when acted upon by said alternating current when said current is of exactly normal frequency.

20. In a clock system, a source of stored energy; a time train including time manifesting means driven from said source; an oscillatory escapement driven by said time train; a source of alternating current of regulated frequency; and means controlled by said alternating current and electromagnetically coupled to said oscillatory escapement to cause said escapement to oscillate at a period which is a multiple, greater than one, of the period of said alternating current, and which means will not interfere with the operation of said escapement during cessation of alternating current.

21. In a sustained-power time indicating system, a source of alternating current of regulated frequency regulated to measure by cycles the lapse of time; a gear train; a main spring to drive said gear train; time manifesting means driven by said gear train; an oscillatory system including an oscillatory inertia member also driven by said gear train and which in turn when free of extraneous magnetic forces controls the rate of operation of said train to cause said time manifesting means to substantially correctly indicate time and which oscillates at a rate so that its period is a multiple greater than one, of the period of said alternating current when of normal frequency; and means governed by said alternating current for exerting magnetic forces on said inertia member to control its rate of operation to operate said time manifesting means to correctly manifest time as determined by the frequency of said alternating current and which will not interfere with the free oscillation of said oscillatory system during the cessation of said alternating current.

22. In combination; an energy storing means; a gear train driven by said energy storing means; a source of alternating current of regulated frequency; a timing unit including a magnetic member having a cycle of operation the time cycle of which is substantially a multiple, greater than one, of the time cycle of said alternating current when of normal frequency; said unit being driven by said gear train and in turn during the cessation of alternating current controlling the rate of operation of said train; and alternating current controlled means acting magnetically upon said magnetic member to cause said magnetic member to operate at a rate so that its time cycle is the said multiple of the time cycle of said alternating current.

23. In a clock, the combination of an escapement mechanism, a synchronous electric motor, means actuated by said motor for controlling said escapement mechanism, and means comprising a resilient member acting under certain abnormal conditions occurring during operation of said escapement controlling means for restraining the amplitude of motion of said escapement mechanism when the amplitude thereof reaches a predetermined point.

24. In a clock, the combination of an escapement mechanism, a synchronous electric motor, means actuated by said motor for controlling said escapement mechanism, and means functioning upon predetermnied increase in amplitude of motion of said escapement mechanism caused by said electric motor and said actuated means and operating to increase the frequency of said escapement mechanism when the amplitude of motion thereof is increased by said controlling means to a predetermined degree.

25. In a clock system, a source of commercial alternating current having its frequency regulated to, by alternating current cycle passage, correctly manifest the passing of time; an oscillatory member having a natural period of oscillation which bears approximately a simple relation to the periodicity of said current; a local source of energy tending to oscillate said member at its natural rate; a synchronous motor operated by current from said source; a shaft; means including a rotary member driven by said motor through the medium of said shaft to rotate at an average speed equal to the rate of oscillation of said oscillatory member; and means acted upon by said rotary member and co-acting with said oscillatory member, to exert a force, over a considerable arc of movement of said oscillatory member, upon said oscillatory member during certain oscillations of said oscillatory member to control its period by either increasing or decreasing the period of said oscillatory member independently of its natural period of oscillation, to cause said oscillating member by its oscillation to correctly manifest the passing of time so long as said alternating current is supplied and manifesting the passing of time as accurately as said oscillatory member is capable of doing during each current cessation.

26. In a clock system, a source of commercial alternating current having its frequency regulated by alternating current cycle passage to correctly manifest the passing of time, an oscillatory member having a natural period of oscillation which bears approximately a simple relation to the periodicity of said current, a local source of energy tending to oscillate said member at its natural rate, a synchronous motor operated by current from said source, a shaft, means including a rotary member driven by said motor through the medium of said shaft to rotate at an average speed equal to the rate of oscillation of said oscillatory member, and means controlled by the rotary member and co-acting with said oscillatory member to control the rate of oscillation of said oscillatory member independently of its natural period of oscillation to cause said oscillatory member by its oscillation to correctly manifest the passing of time so long as said alternating current is supplied and manifesting the passing of time as accurately as said oscillatory member is capable during a current cessation, said last mentioned means being constructed and arranged for resiliently pulling said oscillatory member in varying degree and so that restarting of said synchronous motor after an alternating current cessation will not stop said oscillatory member irrespective of the phase relation than existing between said oscillatory member and said rotary member.

27. In a clock system, a source of commercial alternating current having its frequency regulated to, by alternating current cycle passage, correctly manifest the passing of time; an oscillatory member having a natural period of oscillation which bears approximately a simple relation to the periodicity of said current; a local source of energy tending to maintain said member oscillating at its natural frequency; a synchronous motor operated by current from said source; a shaft; means including a rotary member driven by said motor through the medium of said shaft to rotate at an average speed equal to the rate of oscillation of said oscillatory member; and means controlled by said rotary member and coacting with said oscillatory member to at times exert a force in one direction and at other times exert a force in an opposite direction upon said oscillatory member to increase or decrease the period of oscillation of said oscillatory member above or below its natural period of oscillation to cause said oscillatory member by its oscillation to correctly manifest the passing of time so long as said alternating current is supplied and to manifest the passing of time as accurately as said oscillatory member is capable of doing during each current cessation.

28. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a local source of energy tending to maintain said member oscillating at its natural frequency; a synchronous motor operated by current from said source; means including a rotary member driven by said motor at an average speed equal to the natural frequency of said oscillatory member; and means controlled by said rotary member and co-acting with said oscillatory member to control the frequency of oscillation of said oscillatory member independently of its natural frequency to cause said oscillatory member by its oscillation to correctly manifest the passing of time so long as said alternating current is supplied and manifesting the passing of time as accurately as said oscillatory member is capable of doing during a current cessation, said last mentioned means including means to at times exert a force to urge said oscillatory member when at one side of its middle biased position away from such middle biased position and to at other times exert a force to urge said oscillatory member when at said same one side of its middle biased position toward said biased position.

29. In a clock system; a source of alternating current having its frequency regulated to correctly manifest the passing of time by cycle passage; an oscillatory member biased to a middle position, oscillating on each side of said middle portion and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and co-acting with said oscillatory member to control the frequency of oscillation of said oscillatory member independently of its natural frequency to cause said oscillatory member by its oscillation to correctly manifest the passing of time so long as said alternating current is supplied and manifesting the passing of time as accurately as said oscillatory member is capable of doing during a current cessation, said last mentioned means at times exerting a relatively light force extending over a relatively large arc to urge said oscillatory member in a direction to increase its amplitude and including means to limit its amplitude in one direction from its middle position to a predetermined maximum.

30. In a clock, an escapement having a standard time rate, a power driving means to actuate said escapement, a synchronous motor actuated by the alternating current from a commercial lighting system, intermittent force transmitting means including means controlled by said motor, and means including an oscillatory member of said escapement cooperating with said intermittent force transmitting means to allow said force transmitting means to at times accelerate said member in one direction of movement of said member and to at other times accelerate said member in the opposite direction of movement of said member.

31. In a sustained-power time indicating system, the combination with energy storing means; a time train driven by said energy storing means; a source of alternating current the frequency of which is regulated to deliver a predetermined number of cycles per unit of time; timing means comprising an oscillatory system including an oscillatory magnetic member, and driven by said time train from said energy storing means and in turn controlling the speed of operation of said time train, during abnormal current cessation conditions, and operating at a rate so that the period of said magnetic member is substantially a multiple, greater than one, of the average period of said alternating current; and means controlled by current from said alternating current source acting magnetically on said magnetic member during the supply of alternating current in such a manner that out of each predetermined number of waves of said alternating current only a predetermined fraction thereof act on said magnetic member to control its operation and thereby cause said magnetic member to oscillate at a rate so that its period is exactly the said multiple of the period of said alternating current; said last mentioned means being constructed so as not to interfere with the free operation of said timing means during the cessation of alternating current.

32. In a sustained-power time indicating system, the combination with energy storing means; a time train driven by said energy storing means; an alternating current power distribution system the frequency of which is regulated to deliver a predetermined number of cycles per unit of time; timing means comprising an oscillatory system including an oscillatory member, and driven by said time train from said energy storing means and in turn controlling the speed of operation of said time train, during the cessation of alternating current, and operating at a rate so that the period of said member is substantially a multiple, greater than one, of the average period of said alternating current; and means controlled by alternating current from said power distribution system and acting on said oscillatory member in such a manner that it at times urges said oscillatory member in one direction and at other times urges said oscillatory member in the opposite direction depending upon whether the frequency of said alternating current is temporarily high or is temporarily low; said last mentioned means being constructed so as not to interfere with the free operation of said timing means during the cessation of alternating current.

33. In a clock system, a source of commercial alternating current having its frequency regulated to correctly manifest the passing of time by alternating current cycle passage, an oscillatory member having a natural period of oscillation which bears approximately a simple relation to the periodicity of said current, a local source of energy to oscillate said member at its natural frequency, a synchronous motor operated by current from said source, a shaft, a rotary member driven by said motor through the medium of said shaft to rotate at an average speed equal to the rate of oscillation of said oscillatory member, means controlled by the rotary member and co-acting with said oscillatory member to produce periodic pulls on said member which vary in value depending on the position of said oscillatory member when these pulls occur to control the rate of oscillation of said oscillatory member independently of its natural period of oscillation to cause said oscillatory member by its oscillation to correctly manifest the passing of time so long as said alternating current is supplied, said means ceasing to co-act with said oscillatory member upon cessation of said alternating current.

34. In a maintained-power synchronous electric timing device; the combination with an oscillatory member having a natural period of oscillation to substantially correctly manifest the passing of time; a local source of energy to maintain said member oscillating; time indicating means operatively connected with said member to indicate the time of day; a source of alternating current having its frequency regulated to accurately manifest the passing of time by cycle passage; dominating means controlled by current from said source of alternating current to produce a pulling force acting upon said member periodically once for each period of oscillation of said member when said member exactly correctly manifests the passing of time as indicated by said indicating means, said pulling forces varying in value dependent upon the time phase relationship between said periodic forces and the periodic oscillations of said member to cause said member to oscillate in synchronism with said forces irrespective of its natural period of oscillation.

35. In a maintained-power synchronous electric timing device; the combination with an oscillatory member having a natural period of oscillation to substantially correctly manifest the passing of time; a local source of energy to maintain said member oscillating; time indicating means operatively connected with said member to indicate the time of day; a source of alternating current having its frequency regulated to accurately manifest the passing of time by cycle passage; dominating means controlled by current from said source of alternating current to produce a pulling force acting upon said member periodically once for each period of oscillation of said member when said member exactly correctly manifests the passing of time as indicated by said indicating means, said pulling forces extending over different arcs of movement of said member dependent upon the time phase relationship between said periodic forces and the periodic oscillations of said member to cause said member to oscillate in synchronism with said forces irrespective of its natural period of oscillation.

36. In a maintained-power synchronous electric timing device; the combination with an oscillatory member having a natural period of oscillation to substantially correctly manifest the passing of time; a local source of energy to maintain said member oscillating; time indicating means operatively connected with said member to indicate the time of day; a source of alternating current having its frequency regulated to accurately manifest the passing of time by cycle passage; dominating means controlled by current from said source of alternating current to produce a pulling force acting upon said member periodically once for each period of oscillation of said member when said member exactly correctly manifests the passing of time as indicated by said indicating means, said pulling forces extending over arcs of movement of said member varying in lengths and location dependent upon the time phase relationship between said periodic forces and the periodic oscillations of said member to cause said member to oscillate in synchronism with said forces irrespective of its natural period of oscillation.

37. In a maintained-power synchronous electric timing device; the combination with an oscillatory member having a natural period of oscillation to substantially correctly manifest the passing of time; a local source of energy to maintain said member oscillating; time indicating means operatively connected with said member to indicate the time of day; a source of alternating current having its frequency regulated to accurately manifest the passing of time by cycle passage; dominating means controlled by current from said source of alternating current to produce forces acting upon said member periodically approximately once for each period of oscillation of said member when said member exactly correctly manifests the passing of time as indicated by said indicating means, said forces accelerating said member in a right-hand direction or in a left-hand direction depending upon the time relationship between the cycles of said alternating current and the physical oscillations of said member to cause said member to operate in synchronism with said forces irrespective of its natural period of oscillation and to allow free operation of said member during a current cessation.

38. In a maintained-power synchronous electric timing device; the combination with an oscillatory member having a natural period of oscillation to substantially correctly manifest the passing of time; a local source of energy to maintain said member oscillating; time indicating means operatively connected with said member to indicate the time of day; a source of alternating current having its frequency regulated to accurately manifest the passing of time by cycle passage; dominating means controlled by current from said source of alternating current to produce forces acting upon said member periodically approximately once for each period of oscillation of said member when said member exactly correctly manifests the passing of time as indicated by said indicating means, said forces being exerted from a point in the plane of oscillation of said member, which point lies to one side of the neutral position of said member to which it is biased, and said forces constituting attracting forces or repelling forces depending on the time phase relationship between said forces and the positions assumed by said oscillatory member to cause said member to oscillate in synchronism with said forces irrespective of its natural period of oscillation, said dominating means allowing said member to oscillate at its natural frequency during a current cessation.

39. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and coacting with said oscillatory member to produce periodic pulling forces acting upon said oscillatory member which vary in value depending upon the time phase relationship between said rotary member and said oscillatory member to cause said oscillatory member to operate in synchronism with said rotary member irrespective of the natural frequency of operation of said oscillatory member.

40. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and coacting with said oscillatory member to produce periodic pulling forces acting upon said oscillatory member which forces extend over different arcs of movement of said oscillatory member depending upon the time phase relationship between said rotary member and said oscillatory member to cause said oscillatory member to operate in synchronism with said rotary member irrespective of the natural frequency of operation of said oscillatory member.

41. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and coacting with said oscillatory member to produce periodic pulling forces acting upon said oscillatory member extending over arcs of movement of said member varying in lengths and locations depending upon the time phase relationship between said rotary member and said oscillatory member to cause said oscillatory member to operate in synchronism with said rotary member irrespective of the natural frequency of operation of said oscillatory member.

42. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and coacting with said oscillatory member to produce periodic forces acting upon said oscillatory member periodically once for each rotation of said rotary member said forces accelerating said oscillatory member in a right-hand direction or in a left-hand direction depending upon the time phase relationship between said rotary member and said oscillatory member to cause said oscillatory member to operate in synchronism with said rotary member irrespective of the natural frequency of said oscillatory member.

43. In a clock system; a source of alternating current having its frequency regulated to correctly manifest the passing of time by cycle passage; an oscillatory member biased to a middle position, oscillating on each side of said middle position and having a natural frequency of oscillation which bears approximately a simple relation to the frequency of said alternating current; a source of local energy for at times maintaining said member oscillating at its natural frequency; a synchronous motor operated by current from said source; means including a rotary member driven by said motor at an average speed equal to the natural frequency of said oscillatory member; and means controlled by said rotary member and coacting with said oscillatory member to produce periodic forces exerted upon said oscillatory member from a point in the plane of oscillation of said oscillatory member which point lies to one side of the neutral biased position of said oscillatory member and said forces constituting attracting forces or repelling forces depending on the time phase relationship between said rotary member and said oscillatory member to cause said oscillatory member to operate in synchronism with said rotary member irrecpective of the natural frequency of said oscillatory member.

44. In an electric clock, the combination of a source of alternating current, a reed vibrated by said current, at a certain frequency, a balance having a frequency a submultiple of that of said reed and means whereby said reed forces said balance into step with said current.

45. In an electric clock the combination of a source of alternating current having a certain frequency, an electromagnet connected to said current having an armature vibrating at a sub-multiple frequency, a balance having a sub-multiple frequency to that of said armature and connections between said armature and said balance to hold said balance in step with said current.

46. In combination, time manifesting means, an oscillatory member for controlling the indicating condition of said time manifesting means, a reed having a natural period of oscillation and connections between said reed and member to cause said member to oscillate at a frequency which is a sub-multiple of the frequency of the oscillation of said reed, a source of alternating current, and means energized from said source and acting on said reed to cause said reed to vibrate at a sub-multiple of the frequency of said alternating current, whereby said member oscillates at a submultiple of a submultiple of the frequency of said alternating current.

47. In an electric clock the combination of a source of alternating current having a certain frequency, an electro-magnet connected to said current having an armature vibrating at a sub-multiple frequency, an oscillatory member having a sub-multiple frequency to that of said armature and connections between said armature and said oscillatory member to hold said oscillatory member in step with said current.

48. In combination, a source of synchronized alternating current of a frequency high enough to be used for light and power; a coil connected thereto, a permanent magnet, a tuned reed associated with the coil and the magnet, the natural frequency of the reed being approximately the quotient of the frequency of the alternating current divided by a small integer number, a clock train whose movement is determined by the vibrations of the reed, and a spring to drive said clock train.

49. Time indicating means comprising in combination, a shaft having a timing function, means utilizing said timing function, stored power means for driving said shaft, a mechanical oscillatory escapement for retarding the rotation of said shaft and having a natural periodicity to cause said shaft to manifest substantially correct time, means for changing the periodicity of said escapement upon a sufficient change in the amplitude of oscillation of said escapement, and frequency controlled means controlled by alternating current for determining the amplitude of said oscillatory escapement.

OSCAR H. DICKE.